W. P. ZANE.
Cultivator.
No. 12,611.
Patented Mar. 27, 1855.
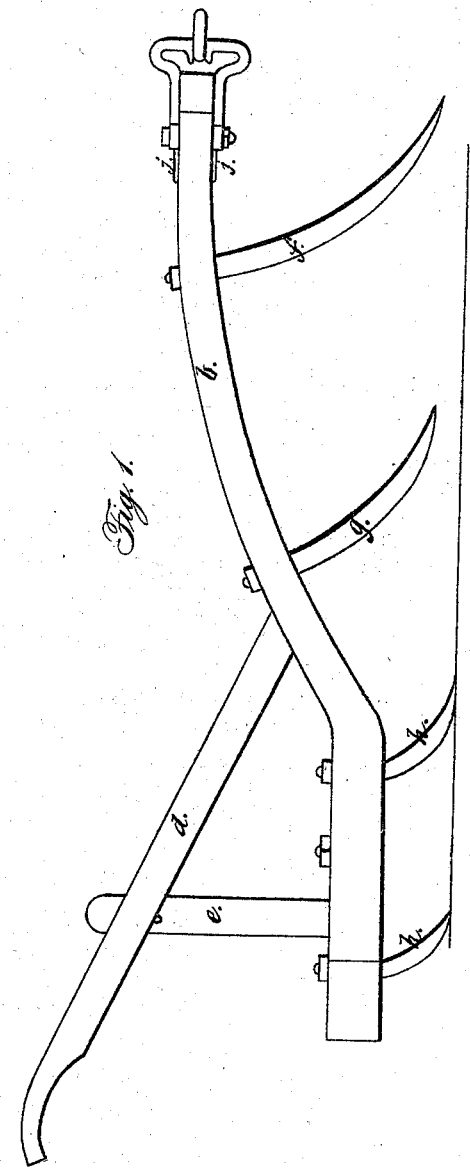
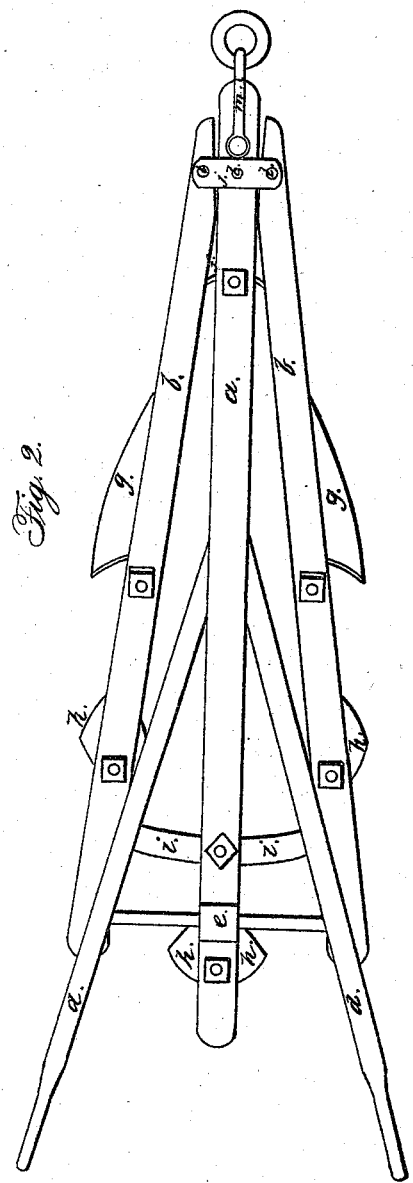

UNITED STATES PATENT OFFICE.

WILLIAM P. ZANE, OF WOOLWICH, NEW JERSEY.

IMPROVEMENT IN CULTIVATORS.

Specification forming part of Letters Patent No. 12,611, dated March 27, 1855.

*To all whom it may concern:*

Be it known that I, WILLIAM P. ZANE, of Woolwich, in the county of Gloucester and State of New Jersey, have invented a new and Improved Cultivator for Cultivating Sweet-Potatoes; and I do hereby declare that the following is a full and exact description thereof, reference being had to the accompanying drawings, making a part of this specification.

The present method of cultivating sweet potatoes is as follows, viz: Three men or boys go forward and move the vines to each side, and are immediately followed by a horse-drawn cultivator and its operator.

My invention consists in constructing a cultivator in such a manner that hooks $f\ g\ g$, combined with the forward portion thereof, will separate the vines centrally between the rows of potatoes and lift them out of the way of the cultivator-teeth $h\ h$, which are combined with the after part of the said implement.

In the accompanying drawings, Figure 1 is a side view, and Fig. 2 a top view, of my improved cultivator.

The central beam, $a$, and the side beams, $b\ b$, of said cultivator are of the shape represented in the drawings—viz., a portion of each beam, near its after extremity, is straight and parallel, or nearly so, with the surface of the ground, and forward of this it curves upward to its front extremity. The said beams are combined with each other by means of the embracing-plates $j\ j$ and rivets $l\ l\ l$ at their front ends, and by the overlapping segments $i\ i$, near their rear ends, or in any other convenient manner. Suitable guiding-handles, $d\ d$, are combined with the cultivator in any suitable manner. The hook $f$, which divides the potato-vines centrally between the rows, is combined with the central beam, $a$, near its front end. The hooks $g\ g$, which lift up the vines and throw them to each side, are shorter than the hook $f$, and are combined with the side beams, $b\ b$, such a distance in the rear of the said hook $f$ as to bring the points of all the said hooks onto the same horizontal plane, or nearly so.

The cultivating-points $h\ h$ may be of any usual shape and combined with the beams of the cultivator in any suitable manner.

The hooks $f\ g\ g$ must be of such a shape that they will not cut or wound the potato-vines, and their points must be such a distance above the points of the cultivating-teeth $h\ h\ h$ that when the cultivating-teeth are inserted the proper distance in the earth the points of the hooks $f\ g\ g$ will be even with the surface of the earth.

The position of the vine-hooks $f\ g\ g$ may be varied to adapt them to varying circumstances in any suitable manner.

Having thus fully described my improved cultivator for cultivating sweet-potatoes, what I claim as my invention, and desire to secure by Letters Patent, is—

The vine hooks $f\ g\ g$, arranged in such a manner in relation to the cultivating teeth $h\ h\ h$ that the said hooks will remove the vines out of the way of the said cultivating-teeth and allow them to operate upon the soil without injury to the vines, substantially as herein set forth.

The above specification of my new and improved cultivator for cultivating sweet-potatoes signed and witnessed this 20th day of February, 1855.

WILLIAM P. ZANE.

Witnesses:
J. S. THOMPSON,
DANIEL S. GROFF.